(12) United States Patent
Kirkland

(10) Patent No.: US 9,197,800 B2
(45) Date of Patent: Nov. 24, 2015

(54) IMAGING ROBOT

(75) Inventor: Lester Kirkland, Ottawa (CA)

(73) Assignee: Resolution Art Inc., Mississauga (CA)

( * ) Notice: Subject to any disclaimer, the term of this patent is extended or adjusted under 35 U.S.C. 154(b) by 204 days.

(21) Appl. No.: 13/989,454

(22) PCT Filed: Nov. 23, 2011

(86) PCT No.: PCT/CA2011/001289
§ 371 (c)(1),
(2), (4) Date: May 24, 2013

(87) PCT Pub. No.: WO2012/068675
PCT Pub. Date: May 31, 2012

(65) Prior Publication Data
US 2013/0242137 A1 Sep. 19, 2013

Related U.S. Application Data

(60) Provisional application No. 61/417,249, filed on Nov. 25, 2010.

(51) Int. Cl.
H04N 5/225 (2006.01)
H04N 7/00 (2011.01)
G01C 3/08 (2006.01)
G03B 37/02 (2006.01)
(Continued)

(52) U.S. Cl.
CPC ............... *H04N 5/2254* (2013.01); *G01C 3/12* (2013.01); *G03B 17/561* (2013.01); *G03B 37/02* (2013.01); *G03B 15/03* (2013.01); *Y10S 901/46* (2013.01)

(58) Field of Classification Search
CPC .......... H04N 5/23238; H04N 5/23277; H04N 5/2624; H04N 5/2628; H04N 5/265
USPC ............. 348/231.99, 373, 371, 218.1, 36–39; 700/245–264; 356/3.01–3.09, 3.1–3.12
See application file for complete search history.

(56) References Cited

U.S. PATENT DOCUMENTS

| 5,596,368 A | 1/1997 | Capper et al. ............ 348/333.01 |
| 6,128,108 A | 10/2000 | Teo ............................... 358/540 |

(Continued)

FOREIGN PATENT DOCUMENTS

| EP | 2244052 | 10/2010 | ............... G01B 5/00 |
| JP | 2006038476 | 2/2006 | ............ G01B 11/00 |

(Continued)

OTHER PUBLICATIONS

Search Report for corresponding European application No. 11842874.

(Continued)

*Primary Examiner* — Sinh Tran
*Assistant Examiner* — Xi Wang
(74) *Attorney, Agent, or Firm* — Teitelbaum & MacLean; Neil Teitelbaum; Doug MacLean

(57) ABSTRACT

An imaging robot for automated digitizing of two-dimensional art is disclosed. The imaging robot includes three mutually orthogonal translation stages for positioning an imaging device at a plurality of shooting positions forming a two-dimensional grid of positions spaced from the art at a substantially same shooting distance. An image of a portion of the art is captured at each of these shooting positions. The images of the portion of the art are then combined, or stitched, forming a composite image of the art.

8 Claims, 15 Drawing Sheets

(51) Int. Cl.
    *G01C 3/12*    (2006.01)
    *G03B 17/56*    (2006.01)
    *G03B 15/03*    (2006.01)

(56) References Cited

U.S. PATENT DOCUMENTS

| | | | |
|---|---|---|---|
| 6,349,153 B1 | 2/2002 | Teo | 382/294 |
| 6,385,349 B1 | 5/2002 | Teo | 382/284 |
| 6,439,515 B1 | 8/2002 | Powers | 248/129 |
| 7,259,784 B2 | 8/2007 | Cutler | 348/223.1 |
| 7,317,558 B2 | 1/2008 | Chiba | 358/450 |
| 7,679,792 B2 | 3/2010 | Marshall et al. | 358/474 |
| 7,778,487 B2 | 8/2010 | Cohen et al. | 382/284 |
| 7,961,983 B2 | 6/2011 | Uyttendaele et al. | 382/294 |
| 2003/0180037 A1* | 9/2003 | Sommers | 396/155 |
| 2004/0141196 A1 | 7/2004 | Jensen et al. | 358/1.9 |
| 2005/0213082 A1* | 9/2005 | DiBernardo et al. | 356/139.03 |
| 2006/0164694 A1* | 7/2006 | Marshall et al. | 358/474 |
| 2006/0268129 A1 | 11/2006 | Deng | 348/239 |
| 2007/0264004 A1 | 11/2007 | Daggett | 396/322 |
| 2008/0201016 A1* | 8/2008 | Finlay | 700/259 |
| 2008/0309774 A1* | 12/2008 | Beng Goh et al. | 348/218.1 |
| 2009/0022421 A1* | 1/2009 | Uyttendaele et al. | 382/284 |
| 2009/0022422 A1 | 1/2009 | Sorek et al. | 382/284 |
| 2009/0315288 A1 | 12/2009 | Hernandez | 280/79.3 |
| 2010/0222925 A1* | 9/2010 | Anezaki | 700/253 |
| 2010/0231780 A1* | 9/2010 | Kawai | 348/335 |
| 2011/0122229 A1* | 5/2011 | Cinquin et al. | 348/47 |
| 2011/0218675 A1* | 9/2011 | Ban et al. | 700/259 |
| 2012/0185096 A1* | 7/2012 | Rosenstein et al. | 700/259 |
| 2012/0269444 A1* | 10/2012 | Naito | 382/197 |

FOREIGN PATENT DOCUMENTS

| | | | |
|---|---|---|---|
| WO | 98/12504 | 3/1998 | G01C 11/02 |
| WO | 2006084385 | 8/2006 | A61B 5/103 |

OTHER PUBLICATIONS

Search Report for corresponding PCT application No. PCT/CA2011/001289.

* cited by examiner

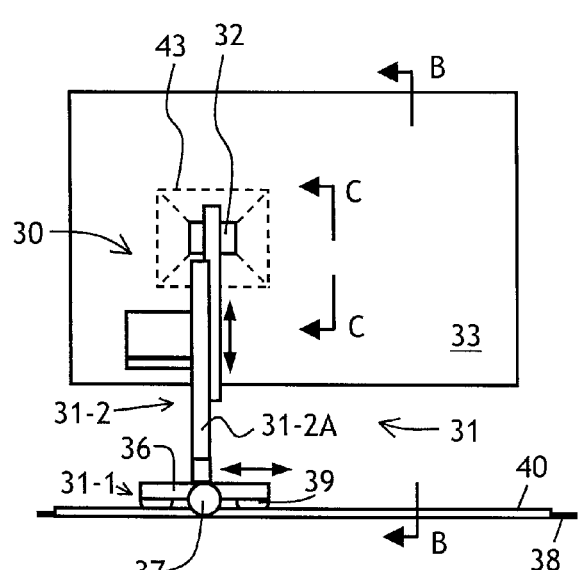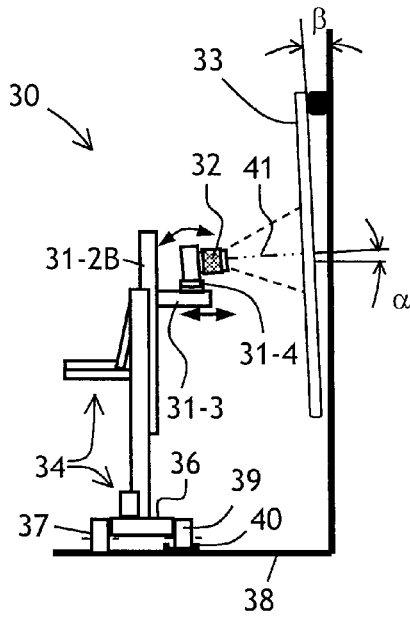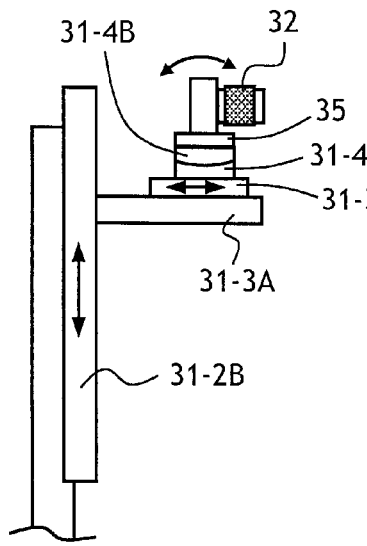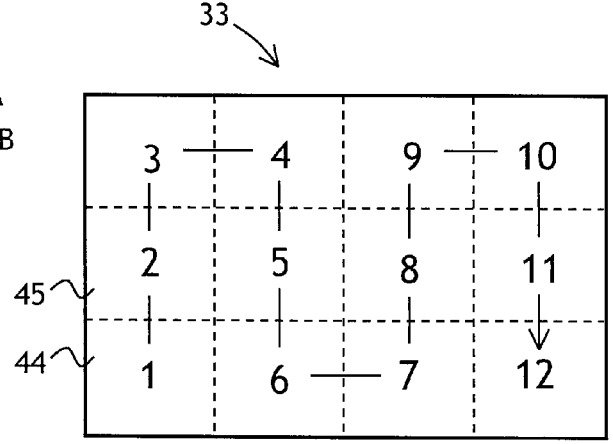
FIG. 3A
FIG. 3B
FIG. 3C
FIG. 4

IMAGING ROBOT

RELATED APPLICATION DATA

This application is the national stage entry of International Appl. No. PCT/CA2011/001289, filed Nov. 23, 2011, which claims priority to U.S. Provisional Patent Application No. 61/417,249, filed Nov. 25, 2010. All claims of priority to these applications are hereby made, and each of these applications is hereby incorporated in its entirety by reference.

TECHNICAL FIELD

The present invention relates to imaging devices and methods, and in particular to imaging robots for automated imaging of surfaces.

BACKGROUND OF THE INVENTION

High-definition imaging is becoming more and more common. Applications of high-definition imaging vary greatly. One such application is digitization of two-dimensional art as for museums, art galleries, and private collectors. The main purpose of art digitization is to capture an accurate and detailed high-definition image of two-dimensional art, to be able to restore the art to its previous condition in case of a damage. Art is also digitized for viewing, maintenance, and/or insurance purposes.

The level of detail available from a single digital photo of a work of art is limited by a number of pixels in the camera sensor. A typical digital camera sensor has a two-dimensional array of approximately 2000×3000 pixels, or 6 megapixels. A very sophisticated camera could have as many as approximately 10,000×6,000 pixels, or 60 megapixels. Even a 60-megapixel camera photographing a 2 meters×1 meter piece of art would yield only 10,000/2,000 cm=5 sampling points per cm of the art, which is not nearly sufficient to satisfy exacting requirements of a museum's conservation department. To digitize the art at a sufficient resolution higher than that of a digital camera, sophisticated flatbed scanners, operating similar to regular document or photo scanners, have been developed. Unfortunately, use of flatbed scanners is intrinsically associated with a possibility of damaging the art when removing the art from its frame, handling the art, placing the art on the flatbed, and so on. Furthermore, flatbed scanners are limited to art of a maximum size. Not infrequently, flatbed scanned images suffer from spurious reflections of light causing white spots on the images. The spots need to be manually removed using specialized software.

To increase the pixel count of an entire captured image, one can photograph the art in portions. The resulting image portions are then combined together, or "stitched", using a variety of "stitching algorithms" available. To photograph the art in portions, one or more high-definition digital cameras are mounted on a fixed assembly. The art needs to be placed in front of the camera and somehow moved across the field of view of the camera(s) to obtain the matrix of images of portions of the art.

In U.S. Pat. No. 7,961,983, Uyttendaele et al. disclose a photography apparatus including a gimbal-mounted digital camera. Referring to FIG. 1, a prior-art mounted camera apparatus 10 of Uyttendaele et al. includes a digital camera 11 mounted on a gimbal mount 12 including X- and Y-tilt gimbal structures 13 and 14, respectively, supported by a tripod 15. In operation, the camera 11 is tilted within the gimbal mount 12 in a raster fashion to capture different portions of an art being photographed. The resulting images are then "stitched" into a single gigapixel image.

Referring now to FIG. 2, a typical set-up for the raster-scan photography is shown. The mounted camera apparatus 10 is placed in front of an art 20 in a dedicated photography room 21. Floodlights 22 are used to illuminate the entire art 20 as evenly as possible. The mounted camera 10 is connected to a computer system 23 via a cable 24. To reduce the influence of ambient light, lighting 25 of the photography room 21 needs to be turned off.

The above described known art imaging techniques share some common drawbacks. The art 20 needs to be moved to the dedicated photography room 21, or an area of the art gallery where the art 20 is displayed needs to be closed to general public. The complete art 20 needs to be uniformly illuminated, which is difficult to do. Furthermore, constant bright light from the floodlights 22 can damage the art 20. To lessen geometrical distortions, the camera 10 needs to be placed far from the art 20, which, when the room is not big enough, can limit the maximum size of the art 20 that can be imaged. Focusing is difficult due to varying distance from the camera 10 to the surface of the art 20. The image stitching process is extremely difficult due to the geometrical distortions of images of the art 20, which are dependent on angles of tilt of the digital camera 11 in the gimbal mount 12.

Until now, the task of creating professional, high-quality digital images of art has required moving the art to a studio suited to photographing large images, or closing of the gallery where the art is installed. It has also required the use of highly-skilled photographers, and/or state-of-the-art flatbed scanning systems. As a consequence, art digitization required a great deal of time and resources, and in many instances there was a considerable risk of damaging the art in the process.

It is a goal of the present invention to provide an imaging robot for automatic capturing digital images of two-dimensional art of virtually any size, without need to move the art; without need to remove the art from its frame; without need to adjust ambient lighting conditions; and even without need to close the exposition areas where the art is displayed. The imaging robot of this invention meets the above goals. Furthermore, it does not require an experienced operator or photographer because the image capturing, processing, and removal of reflections is automated. The art portions being imaged are briefly and selectively illuminated, whereby the risk of damaging the art by the lighting is considerably reduced.

SUMMARY OF THE INVENTION

In the present invention, a painting, or another two-dimensional art work can be imaged directly in situ, on display in a museum, without having to remove the art from its frame, close the area of display, or even turn off ambient lighting. A specialized robot is used to position an imaging device such as a digital camera, together with a dedicated pair of illuminators, in front of the art at a number of pre-defined positions spread across the surface of the art, and an image of a portion of the art is taken at each of these positions, at nearly identical illumination conditions and at nearly identical camera angle and focus. The positions of the camera form a two-dimensional grid of positions, which are spaced from the surface of the art at a same distance. Since the individual component images are taken at a nearly identical focusing, angle, and illumination conditions, the task of stitching the component images in a composite image of the art is considerably simplified.

In accordance with the invention there is provided an imaging robot for use with a imaging device for imaging a surface, comprising:

a positioning system including a support for supporting the imaging device; and mutually orthogonal first, second, and third linear translators coupled to the support, for positioning the imaging device in front of the surface at a plurality of shooting positions forming a two-dimensional grid of positions spaced from the surface at a substantially same shooting distance; and a controller for providing control signals to the first, the second, and the third translators for positioning the imaging device and for causing the imaging device to capture a component image of a portion of the surface at each of the shooting positions.

In one embodiment, a marker light source is used to provide at least one marker beam of light directed towards the surface being imaged at a pre-defined position and angle with respect to the camera support, to form at least one reference spot on the surface, for determination of a distance between the camera and the surface from a position of the at least one reference spot on an image of the surface captured by the imaging device. Also in one embodiment, the at least one marker beam includes three or four marker beams directed towards the surface being photographed at pre-defined positions and angles with respect to the camera support, to form at least three non-collinear reference spots on the surface, for determination of a shooting angle of the imaging device from a relative position of the at least three reference spots on an image of the surface captured by the imaging device.

A preferred embodiment of the invention is specifically suited to imaging of vertical or nearly vertical surfaces, such as surfaces of paintings in an art gallery. In this embodiment, the imaging robot comprises a horizontal base; the first translator comprises a driven wheel mounted to the base, for rolling on a horizontal floor of the art gallery, and a pair of rollers mounted to the base, optionally guided by a track on the floor, for moving the base horizontally with respect to gravity, along the surface to be imaged. The second translator comprises a linear translation stage extending from the base vertically with respect to gravity, the linear translation stage comprising a first portion mounted to the base, and a second portion translatable relative to the first portion, vertically with respect to gravity, and across the surface to be imaged. The third translator comprises a linear translation stage having a first portion and a second portion translatable relative to the first portion, horizontally with respect to gravity, towards and away from the surface being imaged. The first portion of the third translator is mounted to the second portion of the second translator. The tilt stage comprises first and second portions movable angularly with respect to each other, the first portion of the tilt stage being mounted to the second portion of the third translator, and the second portion of the tilt stage being mounted to the support of the camera.

The imaging device can include a digital camera, an X-ray imager, a holographic imager, an optical beam scanner, or any other imaging device for imaging two-dimensional surfaces. The illuminator used for selective illumination of portions of the imaged surface can include a flash lamp or a light emitting diode (LED). Using illuminators (LEDs) at different wavelengths allows one to perform multi-color/multi-spectral imaging of the surface using a monochromatic array of detectors. Ultraviolet (UV) and infrared (IR) illuminators can be used for imaging in UV and IR wavelength ranges.

In accordance with another aspect of the invention there is further provided an image processing server for combining the component images captured by the imaging device of the imaging robot into a single composite image of the surface. The imaging processing server includes an input port for connecting the memory unit storing the component images, and a processor coupled to the input port, programmed to obtain the component images from the memory unit and to combine the component images into the composite image of the surface.

In accordance with yet another aspect of the invention there is further provided a method for automated imaging of a surface, comprising:

(a) operating mutually orthogonal first, second, and third linear translators to automatically position an imaging device in front of the surface at a plurality of shooting positions forming a two-dimensional grid of positions spaced from the surface at a substantially same shooting distance;

(b) causing the imaging device to capture a component image of a portion of the surface at each shooting position of step (a); and (c) upon completion of steps (a) and (b), combining the component images of step (b) into a composite image of the surface.

BRIEF DESCRIPTION OF THE DRAWINGS

Exemplary embodiments will now be described in conjunction with the drawings, in which:

FIG. 3A is a frontal view of an imaging robot of the invention, capturing images of a painting hanged on a wall;

FIG. 3B is a side view taken along the lines B-B on FIG. 3A;

FIG. 3C is a magnified side view taken along the lines C-C on FIG. 3A;

FIG. 4 is a diagram showing a succession of portions of the painting sequentially imaged by the imaging robot of FIG. 3;

DETAILED DESCRIPTION OF THE INVENTION

Figure 1:
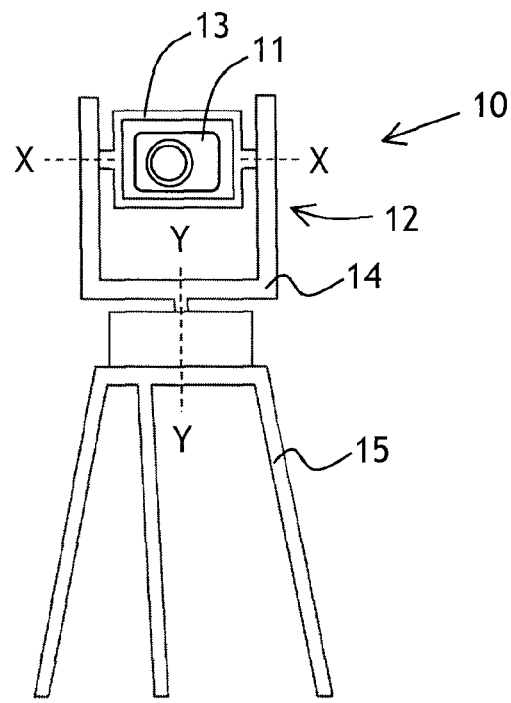
FIG. 1 is a frontal view of a prior-art mounted camera apparatus.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Referring to FIGS. 3A to 3C, an imaging robot 30 includes a positioning system 31 for supporting and positioning a digital camera 32 in front of a painting 33, and a controller 34 for controlling the positioning system 31 and the camera 32. The positioning system 31 includes sequentially coupled and mutually orthogonal first, second, and third linear translators 31-1, 31-2, and 31-3, for translating the camera 32 across the painting 33, and a tilt stage 31-4 coupled to a support 35 for supporting the camera 32, for adjusting a tilt angle α of the camera 32 to match a hanging angle β of the painting 33, thus orienting an optical axis 41 of the camera 32 perpendicular to the surface of the painting 33. The directions of translation and tilt are shown in FIGS. 3A to 3C with double-headed solid arrows.

In the embodiment shown in FIGS. 3A and 3B, the first translator 31-1 includes a base 36, a driven wheel 37 mounted to the base 36, for rolling on a substantially horizontal floor 38, and a pair of guiding rollers 39 mounted to the base 36, guided by an optional track 40 on a floor 38, for moving the base 36 together with the rest of the positioning system 31 and the camera 32 horizontally with respect to gravity, thus shifting the camera 32 horizontally, along (or parallel to) the surface of the painting 33. In one embodiment, the optional track 40 is not used, and two driven wheels 37 disposed symmetrically with respect to the rollers 39, are used instead of one driven wheel 37. The second linear translator 31-2 is a linear translation stage extending vertically from the base 36, having a first portion 31-2A fixed to the base, and a second portion 31-2B movable in vertical direction, thus shifting the camera 32 vertically, nearly parallel to the surface of the painting 33. The vertical translation is not exactly but "nearly" parallel because, while the camera 32 is translated by the second translator 31-2 almost exactly vertically, a painting is usually hanged at the angle β slightly (for example, within 15 degrees) away from vertical. The third linear translator 31-3 is also a linear translation stage having a first portion 31-3A mounted to the second portion 31-2B of the second linear translator 31-2, and a second portion 31-3B movable relative to the first portion 31-3A towards and away from the surface of the painting 33. The third linear translator 31-3 shifts the camera 32 horizontally, towards and away from the surface of the painting 33, to keep the camera 32 at substantially the same distance, herein called a "shooting distance", from the surface of the painting 33 upon vertical translation by the second linear translator 31-2, thus compensating for the hanging angle β of the painting 33. The tilt stage 31-4 includes a first portion 31-4A fixed to the movable portion 31-3B of the third translator 31-3, and a second portion 31-4B tiltable, or movable angularly, with respect to the first portion 31-4A. The camera support 35 is mounted to the movable portion 31-4B of the tilt stage 31-4, or it may be an integral part of the movable portion 31-4B. As noted above, the function of the tilt stage 31-4 to adjust the tilt angle α of the camera 32 to match the hanging angle β of the painting 33. The tilt stage 31-4 is optional, however its use allows to shoot image frames 43 at straight angle to the surface of the painting 33, thus capturing virtually undistorted images, which simplifies subsequent image processing.

In operation, the controller 34 provides control signals to the translators 31-1 to 31-3 to position the camera 32 at a plurality of shooting positions forming a two-dimensional grid of positions spaced from the surface of the painting 33 at a substantially same shooting distance. At each of these shooting positions, the controller 34 provides a signal to the camera 32 to capture an image, herein called a "component image", of a portion of the surface of the painting 33. An illuminator such as a pair of flash lamps, not shown in FIGS. 3A to 3C, can be used to selectively illuminate the portion of the surface of the painting 33 being imaged. The captured component images are packed into a single encrypted file, which is transferred to a memory unit, such as an external flash memory card or a hard drive, operationally coupled to the controller 34, for subsequent transfer to a powerful computer station for combining, or stitching the component images into a single full image, herein called a "composite image", of the painting 33. The controller 34 may include a laptop computer mounted to the imaging robot 30 at a height convenient for operation by a person standing next to the imaging robot 30. The controller 34 and its operation will be considered in more detail further below.

Referring now to FIG. 4, a succession of portions of the painting 33 to be sequentially photographed by the imaging robot 30 is illustrated by numerals 1 to 12 indicating the order of taking the component images of the painting portions 1-12. Initially, the imaging robot 30 positions the camera 32 against the lower-leftmost portion 1, captures a first component image 44 of the portion 1, then shifts to the portion 2 directly above the lower-leftmost portion 1, captures a second component image 45 of the portion 2, and so on.

Figure 5A:
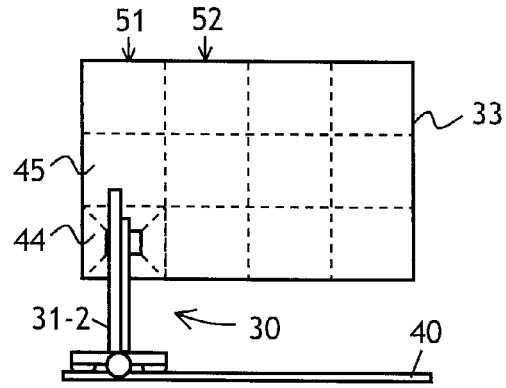
FIGS. 5A to 5F are views of the imaging robot of FIG. 3 in front of the painting, capturing a succession of images of the painting portions.
Figure 5D:
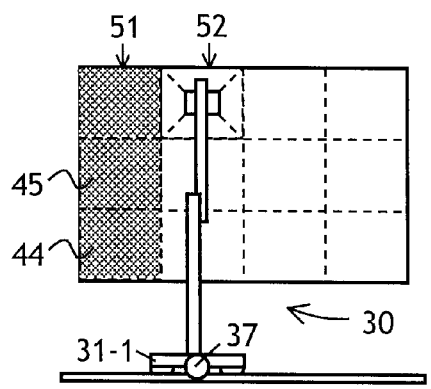
Figure 5B:
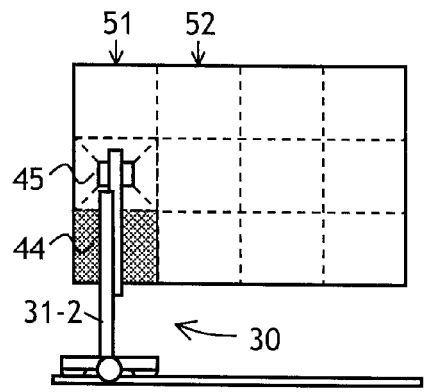
Figure 5E:
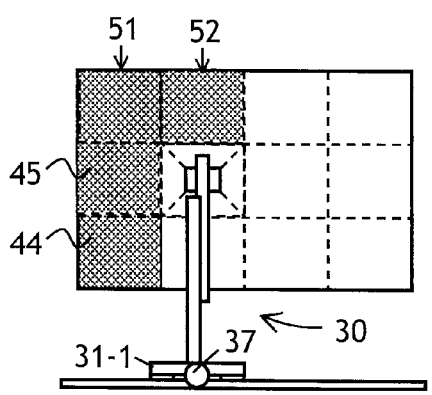
Figure 5C:
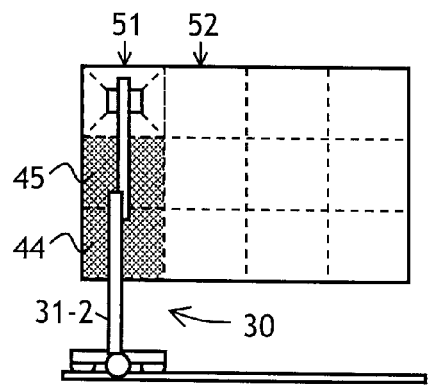
Figure 5F:
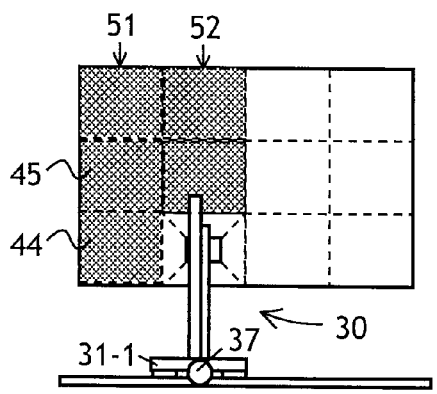

Turning to FIGS. 5A to 5F, the imaging robot 30 moves the camera 32 to the left bottom corner of the painting 33 as shown in FIG. 5A, captures the first component image 44 of a leftmost vertical column 51 of portions of the painting 33. Then, the imaging robot 30 actuates the second linear translator 31-2 to raise the camera 32 to a position of FIG. 5B. The distance from the camera 32 to the painting 33 may be adjusted by actuating the third linear translator 31-3 (not shown in FIGS. 5A to 5F). The camera 32 is actuated to capture the second component image 45. The robot then proceeds to take the remaining component images, as shown in FIGS. 5C to 5F. In particular, in a step illustrated in FIG. 5D, the driven wheel 37 of the first linear translator 31-1 is actuated to shift the imaging robot 30 to a capture component images in a second vertical column of image portions 52. Images of painting portions can of course be captured in another order, although a zigzag pattern of FIGS. 4 and 5A to 5F is preferable, because it minimizes the number of horizontal movements of the entire imaging robot 30. Images of painting portions are captured with an overlap of 10-50% or more, to even out minor brightness variations during image stitching.

Figure 6:
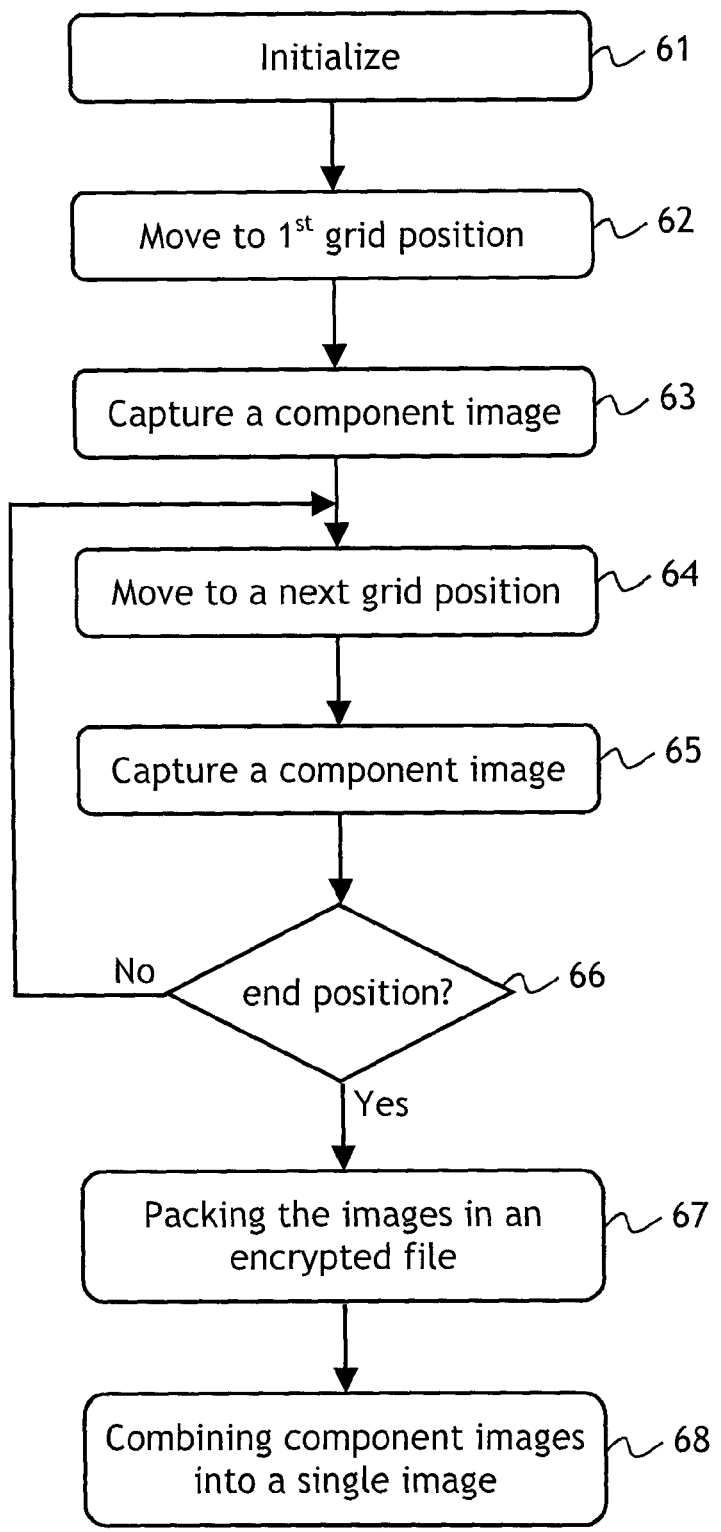
FIG. 6 is a flow chart of method steps for obtaining a digital image of the painting according to FIGS. 3A to 3C, FIG. 4, and FIGS. 5A to 5F.

Referring to FIG. 6, a method of automated imaging of a surface of the painting 33 is presented. In a step 61, the imaging robot 30 is initialized. The initialization may include calibration of the robot 30, inputting painting dimensions and required resolution in dots per inch (dpi), determination of the hanging angle β, opening/creating a session file, etc. In a step 62, the imaging robot 30 moves the digital camera 32 to the first grid position corresponding to the lower-leftmost portion 1 of the painting 33 in FIG. 4. In a step 63, the first component image 44 of the lower-leftmost portion 1 of the painting 33 is captured and transferred to a memory unit of the controller 34. This step can include automatic adjustments of focus, preferably by moving the digital camera 32 towards or away from the painting 33 instead of adjusting the camera lens. In steps 64 to 66, the imaging robot 30 moves the camera 32 at a grid of positions shown in FIGS. 4 and 5A to 5F and captures component images, which are then transferred to the memory unit of the controller 34. Focus can be adjusted if required, preferably by moving the digital camera 32 towards or away from the painting 33. When the end position is reached and a component image at that position (portion 12) is taken, the component images are stored in a single encrypted file in step 67, for subsequent processing. Finally, in a step 68, the component images are combined, or stitched, forming a single composite image.

Figure 2:
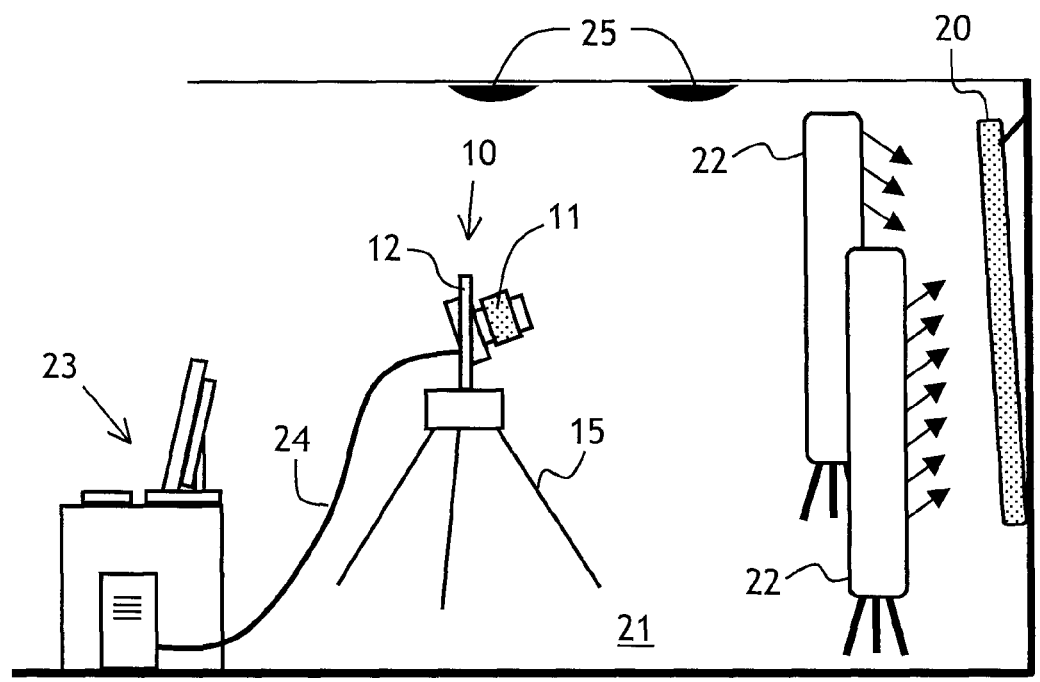
FIG. 2 is a view of a prior-art photography room.

For ease of stitching of the component images, the images are taken with an overlap of at least 10%, or even as much as 50% of each neighboring image area. A variety of image stitching algorithms are known in the art. Generally, to provide image stitching, neighboring areas of each image are analyzed for similarities in the captured image features, and then each image is adjusted in x-y position, brightness, color, etc., to combine the common image features on neighboring component images. Since positioning of the camera 32 is controlled automatically and is known with a reasonably high precision, the stitching process is significantly simplified as compared, for example, to imaging using a gimbal-based prior-art mounted camera apparatus 10 of FIGS. 1 and 2. In the prior-art mounted camera apparatus 10, the images are distorted due to changing camera aiming and distance to the art 20. Taking each component image at nearly identical orientation and shooting distance facilitates subsequent stitching.

Preferably, the camera 32 does not move when capturing an image of a portion of the painting 33, even when a flash light is used to illuminate the portion being photographed. However, it is possible to photograph the painting 33 while moving the camera 32 along the path shown in FIG. 4, if the flash of light is of a short enough duration not to blur the resulting images in the direction of motion. For example, for the camera moving at speed of 5 cm/sec and for a flash duration of 10 microseconds, the camera moves only by 0.5 micrometers per flash, which is acceptable.

Figure 7:
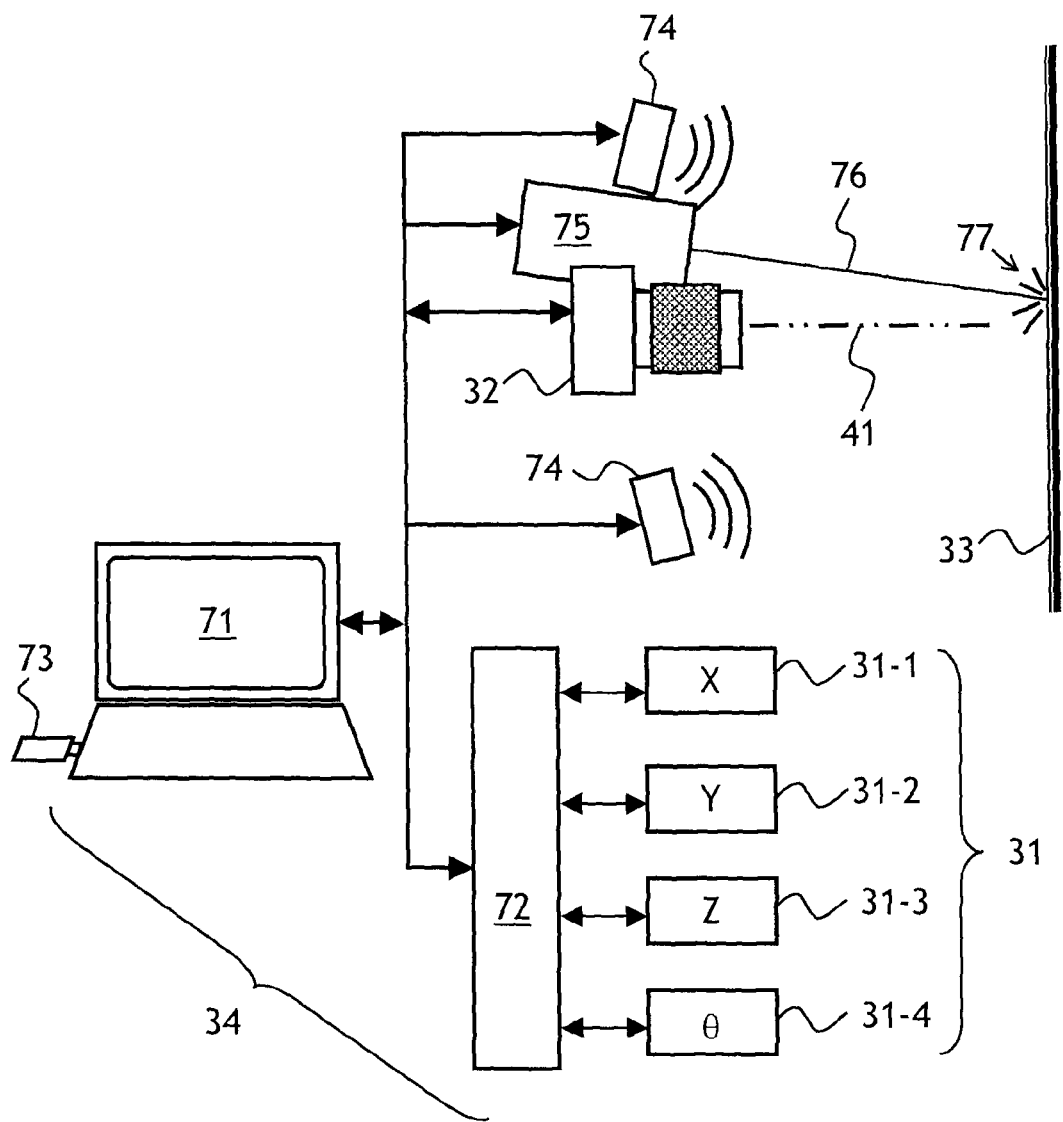
FIG. 7 is a block diagram of a controller, an illumination system, and a marker light source of the imaging robot of FIGS. 3A to 3C.

Turning to FIG. 7, the controller 34 of the imaging robot 30 includes a laptop computer 71 connected to a stepper motor driver unit 72 for controlling stepper motors of the first, second, and third linear translators 31-1 to 31-3 and the tilt stage 31-4. The laptop computer 71 is also connected to the camera 32, two flash lamps 74 disposed and oriented symmetrically with respect to the camera 32, and a marker light source 75, which will be described further below. In operation, the laptop computer 71 activates the stepper motors and triggers the camera 32, which in its turn triggers the flash lamps 74. Thus, the laptop computer 71 performs the steps 61 to 67 (FIG. 6) of capturing the full set of the component images and transferring them to a memory unit 73 operationally coupled to the laptop 71. The memory unit 73 can include a flash memory card or an external hard drive.

Using the flash lamps 74 allows one to considerably reduce the total amount of illuminating light, or total energy (optical power multiplied by time) of illuminating light required to digitize the entire image 33. In the prior art as shown, for example, in FIG. 2, the flood lights 22 illuminate the entire painting 20, regardless of which part of the painting 20 is being photographed at the moment. Furthermore, the flood lights 22 constantly illuminate the painting 20 during the entire photo-session, which can take hours. In the present invention, only a fraction of the painting is illuminated, and only during the time the shutter of the camera 32 is open. Another advantage of using the flash lamps 74 is that the sensitivity of the camera 32 to ambient light is dramatically reduced, so the ambient light can remain turned on during the automated photo shooting session with the imaging robot 30. Accordingly, the area of an exhibition where the painting 33 is displayed needs not be closed to general public. The imaging robot 30 can be operated while art gallery visitors walk around enjoying the exhibition.

In one embodiment, the imaging robot turns off one of the flash lamps when capturing a component image close to a border of the painting 33, to avoid shadows thrown on the surface of the painting 33 by its frame. Only one of the flash lamps 74, that is farthest from the frame, is used. For example, when capturing images of the leftmost portions 1, 2, 3 of the painting 33 as seen in FIG. 4, the left flash lamp 74 is turned off, and only the right flash lamp 74 is used to illuminate the portions 1, 2, 3 of the painting 30. When capturing images of the rightmost portions 10, 11, 12 of the painting as seen in FIG. 4, the right flash lamp 74 is turned off, and only the left flash lamp 74 is used to illuminate the portions 10, 11, 12 of the painting 30.

The marker light source 75 is disposed in a fixed relationship to the camera support 35, emitting a marker beam 76. In operation, the marker beam 76 is directed towards the surface of the painting 33 to form the at least one reference spot 77 on the surface of the painting 33.

From a position of the at least tone reference spot 77 on an image captured by the camera 32, a distance between the camera 32 and the painting 33 can be determined, as explained below.

Figure 8A:
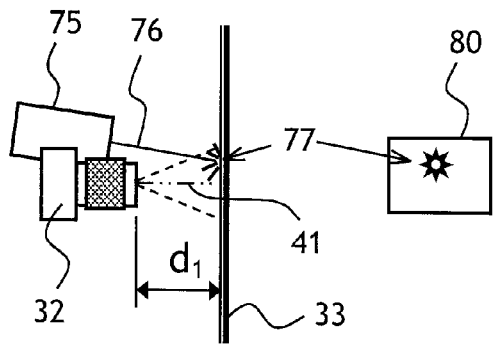
FIGS. 8A to 8C are side views of a digital camera shown with a marker light source emitting a beam of light for determining of a distance to a surface of the painting being photographed from the position of a reference spot formed by the reference light beam within the field of view of the camera.
Figure 8B:
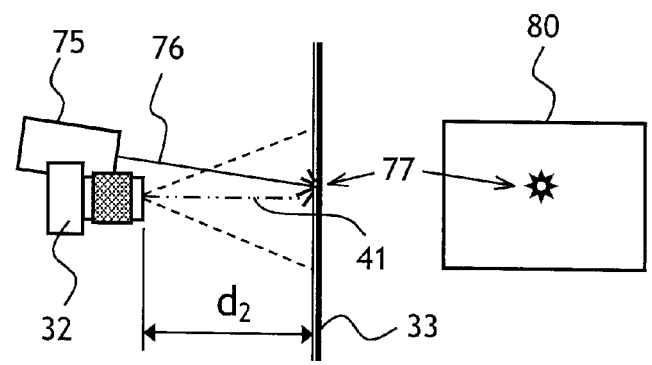
Figure 8C:
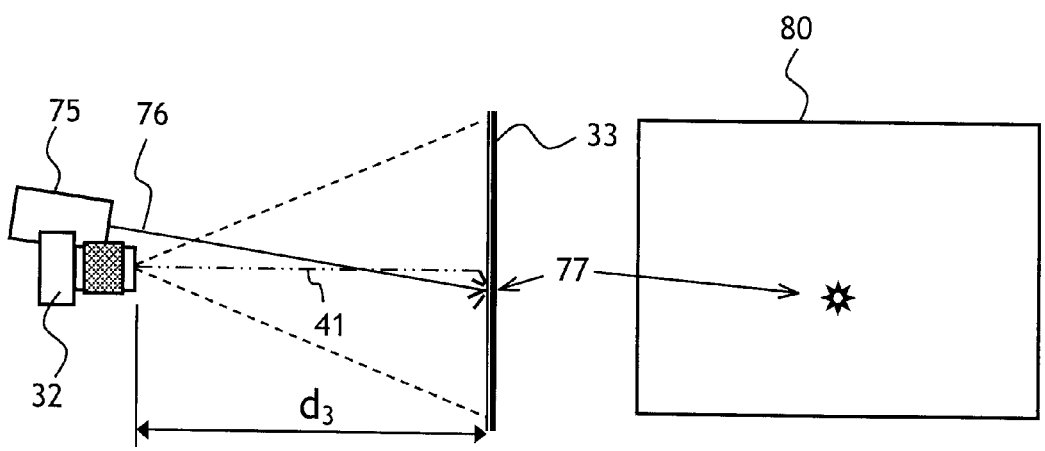

Referring to FIGS. 8A to 8C, the marker 75 emits the marker beam 76 forming the reference spot 77 on the surface of the painting 33. The position of the reference spot 77 within a field of view 80 of the camera 32 will depend on a distance d between the camera 32 and the painting 33. For example, in FIG. 8A, at a distance $d_1$ between the camera 32 and the painting 33, the spot 77 is located in the upper half of the field of view 80; in FIG. 8B, at a distance $d_2$, the spot 77 is located close to the middle of the field of view 80; and in FIG. 8C, at a distance $d_3$, the spot 77 is located in the lower half of the field of view 80. Accordingly, the distance d between the camera 32 and the surface of the painting 33 can be determined form the position of the spot 77 in the field of view 80 of the camera 32 by using simple trigonometry and/or an empirical calibration.

It is noted that, although the marker beam 76 is shown in FIGS. 7 and 8 emitted at an angle to the optical axis 41 of the camera 32, the marker beam 76 can also be parallel to the optical axis 41, being laterally offset from the optical axis 41. In this case, the position of the spot 77 in the field of view 80 of the camera 32 will also depend on the distance d between the camera 32 and the painting 33. For example, when the painting 33 is close to the camera 32, the spot 77 will be disposed away from the center of the field of view 80, due to the lateral offset between the marker beam 76 and the optical axis 41. As the camera 32 moves away from the painting 33, the spot 77 will shift closer to the center of the field of view 80. This occurs because as the camera 32 moves away the painting 33 at a constant angular field of view, the linear field of view 80 expands as seen in going from FIG. 8A to 8C.

Figure 9:
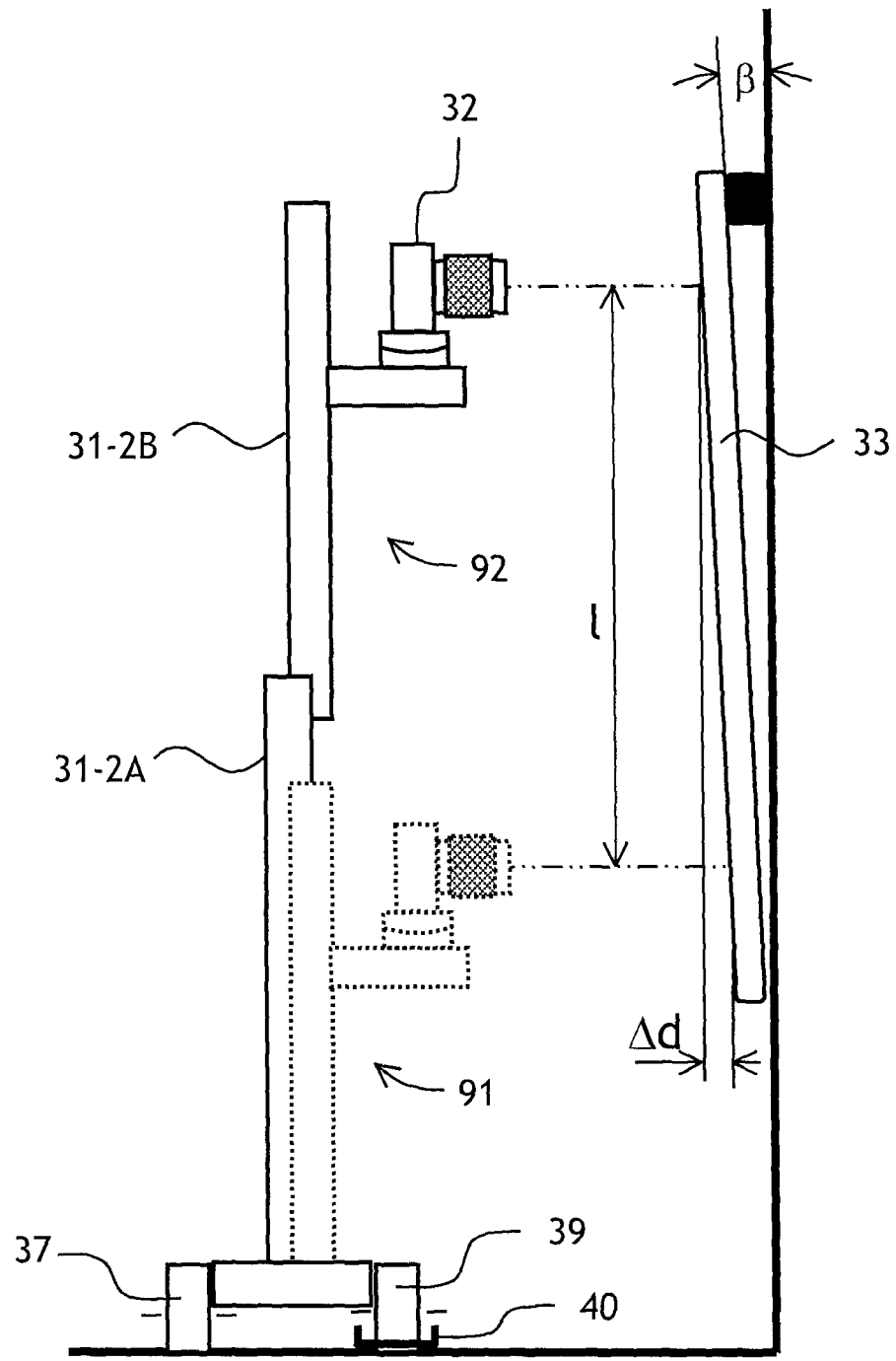
FIG. 9 is a side view of the imaging robot of FIGS. 3A to 3C at two positions of the digital camera for determining of an angle at which the painting is hung on the wall.
Figure 10:
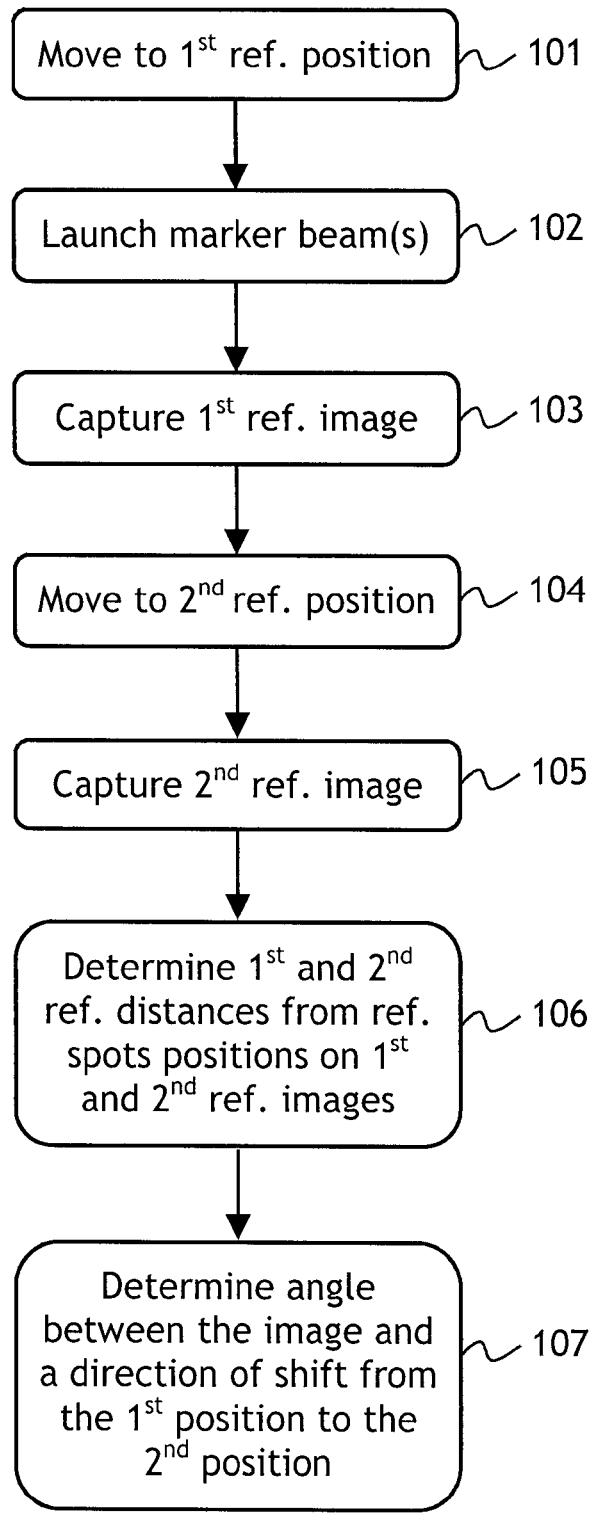
FIG. 10 is a flow chart of a method of determining the hanging angle of the painting shown in FIG. 9.

Turning now to FIGS. 9 and 10, the hanging angle β of the painting 33 can be determined by positioning the camera 32 at two reference positions, 91 and 92, at the bottom and at the top of the painting 33, respectively, separated by a vertical distance l, and measuring the distance d between the camera 32 and the painting 33 at each of these positions using the previously described method. In a step 101, the camera 32 is moved to the first reference position 91 shown with dotted lines. In a step 102, the marker beam 76 is launched by the marker beam source 75. In a step 103, a first "reference image" is captured. In a step 104, the camera 32 is moved to the second reference position 92 shown with solid lines. In a step 105, a second reference image is captured. In a step 106, the first and the second reference distances are determined as explained above, and a differential distance Δd is calculated. Once the differential distance Δd is known, an angle between the surface of the painting 33 and the direction of the lateral shift form the position 91 to the position 92 can be calculated. Assuming that the directional of the lateral shift is exactly vertical, the hanging angle β is determined at a step 107 using the following formula:

$$\beta = \tan^{-1}\left(\frac{\Delta d}{l}\right) \quad (1)$$

The determined hanging angle β can be taken into account by the imaging robot 30 in two ways. First, the distance between the camera 32 and the surface of the painting 33 can be kept constant upon vertical displacement of the camera 32, by actuating the third linear translator 32-1 upon, or simultaneously with, a vertical translation of the camera 32 by the second linear translator 31-2. Second, the camera 32 can be pre-tilted by the tilt stage 31-4 to make the optical axis 41 of the camera 32 perpendicular to the surface of the painting 33. As a result, the component images are taken by the imaging robot 30 from substantially a same shooting distance, and at a same (90 degrees) shooting angle.

A similar calibration can also be performed by translating the camera 32 horizontally using the first linear translator 31-1, to compensate for possible lack of parallelism between the rail 40 and the painting 33.

Figure 11A:
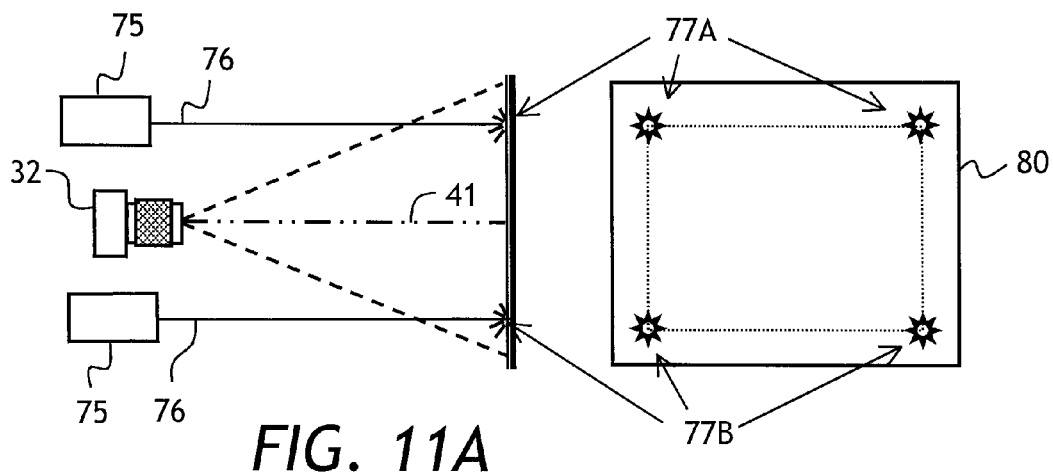
FIGS. 11A and 11B are side views of digital camera shown with a marker light source(s) emitting four beams of light for determining of the camera's shooting angle.
Figure 11B:
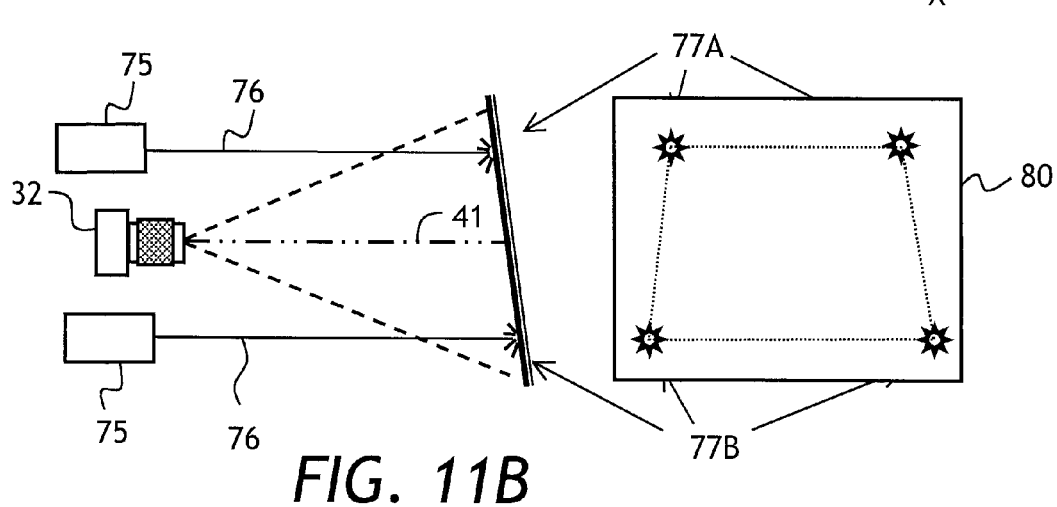

By using at least three, and preferably four reference beams 76, not only the shooting distance but also shooting angle (an angle between the optical axis 41 of the camera 32 and the surface of the painting 33) can be determined. Referring now to FIGS. 11A and 11B, four reference beams 76 are directed to the painting 33 by four sources 75 or a single source 75 equipped with beamsplitters, not shown. As a result, four reference spots, including two upper spots 77A and two lower spots 77B, are formed at four corners of the field of view 80 of the camera 32. In FIG. 11A, the shooting angle is 90 degrees, and the resulting pattern of the reference spots 77A, 77B is perfectly symmetrical. In FIG. 11B, the shooting angle is away from 90 degrees, and the resulting pattern of the reference spots 77A, 77B is asymmetrical. Therefore, the shooting angle can be determined from the relative positions of the four reference spots 77A, 77B within the field of view 80 of the camera 32. At least three non-collinear reference spots 77 should be used to determine the shooting angle, because three non-collinear points define a plane. In the embodiment shown, the reference beams 76 are parallel to the optical axis 41, although they do not have to be.

To determine the position of the four spots 77A, 77B in the field of view 80, an image is captured, and X- and Y-pixel numbers corresponding to the peaks of the spots 77A, 77B are determined. If the peaks are disposed symmetrically within the field of view, that is, if the X-distances between two upper spots 77A and between the two lower spots 77B are equal as shown in FIG. 11A, then the shooting angle is 90 degrees. If the X-distances are not equal as shown in FIG. 11B, then the shooting angle is away from 90 degrees.

The shooting angle measurement shown in FIGS. 11A and 11B can be used to adjust the camera angle by operating the tilt stage 31-4 to make the shooting angle straight, that is, normal to the surface of the painting 33, and which adjustment the component image is recaptured at the straight shooting angle; and/or to stretch the component images if the shooting angle was not perfectly straight, and no image was ever captured at the straight angle. It is preferable to correct the camera angle to make a perfectly straight shot. The stretching, if any, is preferably done at the image processing/stitching stage. To obtain information about the shooting angle used in the session, at least some of the component images can be taken twice: first time with the marker light source(s) turned off, and second time with the marker light source(s) turned on. For example, at least one image in a vertical column of images can be taken twice to obtain information about the local shooting angle in that column. The angular changes are gradual and need not be measured with a great frequency. Photos with the marker lights on are discarded in (or before) the stitching process, once the distance/angle data has been extracted as explained above.

The imaging robot 30, and the imaging/calibration techniques described above, can be used with a variety of imaging devices in place of, or in addition to, the digital camera 32. For example, an X-ray imager, a holographic imager, or an optical laser beam scanner can be used. Various illumination sources can be used in place of the flash lamps 74. Use of light emitting diodes (LEDs) is particularly interesting. LEDs of various colors can be used to provide multi-color imaging using a monochromatic camera, which can have a higher resolution than a full-color camera. Furthermore, infrared (IR) and ultraviolet (UV) LEDs can be used for multi-spectral imaging. In multi-color/multi-spectral imaging, a succession of images is taken at each illumination wavelength, or group of illumination wavelengths. The portion of the surface being imaged is repeatedly illuminated with light at different wavelengths, and a separate component image is taken by the imaging device at each wavelength of illumination. These "monochromatic" images can be combined into a single colored image. Herein, the term "light" includes not only visible light, but also UV and IR emissions.

Furthermore, the imaging robot 30 can include more than one imaging device, i.e. an array of imaging devices. An array of imaging devices (e.g. a plurality of digital cameras 32) aimed at the painting 33 can be mounted on the support 35 in a fixed apart relationship, to speed up capturing of component images. For example, component images in the two rows 51 and 52 in FIG. 5A to 5F can be captured at the same time with two digital cameras 32 spaced apart horizontally.

Figure 12:
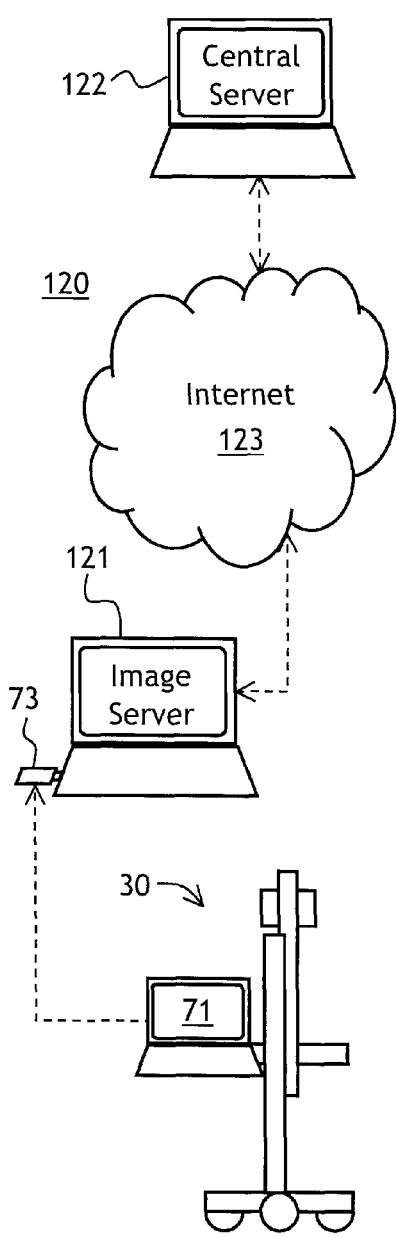
FIG. 12 is a block diagram of a web-based production image management system including the imaging robot of FIGS. 3A to 3C, an image server, and a central server.

Turning now to FIG. 12, a web-based production image management system 120 of the invention includes the imaging robot 30, an image server 121, and a central server 122 connected to the image server 121 over Internet 123. The production management system 120 allows a client such as an art gallery to digitize their art and manage the images for restoration, defect detection, virtual gallery creation, art insurance, etc., with minimum training and supervision. A single employee of the art gallery, having only a general knowledge of computers and no previous photography experience, can be trained in two weeks time to operate the imaging robot 30, to obtain images of art displayed and/or stored in the gallery, to process the images using the image server 121, and to store the resulting gigapixel images of art in a database for future use as required.

Figure 13:
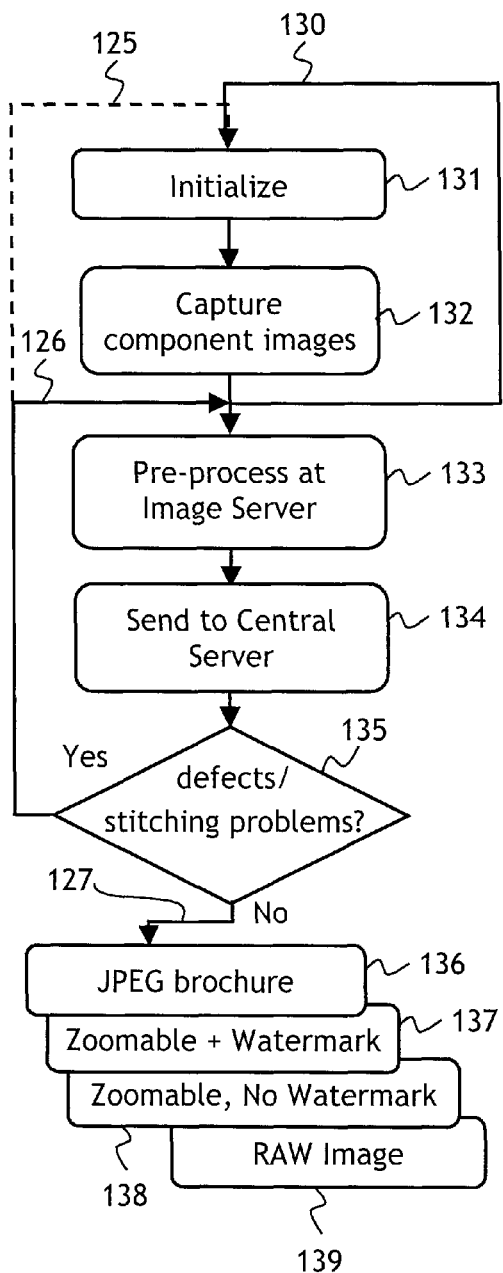
FIG. 13 is a flow chart of a method for digitizing art according to the present invention using the production image management system of FIG. 12.

Referring now to FIG. 13, in a step 131, the imaging robot 30 is initialized. The initialization step 131 must be performed before imaging a new painting 33. In this step, a technician places the imaging robot 30 in front of the new painting 33. The imaging robot 30 finds/calculates painting edges, performs the hanging angle β calibration as described above with reference to FIGS. 9 and 10, etc. In a step 132, the imaging robot 30 captures component images of the entire painting 33 as described above with reference to FIGS. 4, 5A to 5F, and 6. Then, the technician moves the imaging robot 30 to a next painting 33, and the process repeats as indicated at 130, 131, and 132.

Once all the paintings 33 are photographed, for example close to an end of a working day, the technician transfers the memory unit 73 to the image server 121. The memory unit 73 holds all component images pertaining to a particular painting 33, preferably in a single encrypted file ("Encrypted Packed Session" file). The image server 131 is instructed to import the Encrypted Packed Session files generated during the day, and to proceed with pre-processing the images at a step 133. The pre-processing includes stitching the component images to form composite digital images of the paintings 33 photographed during the working day at steps 131, 132. Depending on the number of square meters digitized, on the resolution selected, and on the computing power of the image server 121, the processing may take several hours. It may be conveniently done overnight.

In a step 134, the image server 121 transmits, via an Internet connection, certain data about the results of the pre-processing to a central server 122. The full color image itself is not transmitted, just a minimal representation data. In a step 135, the central server 122 evaluates the overall success the digitization and the image processing and recommends one of the following:

i. Re-digitizing the entire art or just a part of the art (125). This is rarely required.
    ii. Re-processing with modified parameters (126).
    iii. Proceeding to a next step (127).

Upon receiving the recommendation 127 to proceed to the next step, the image server 121 generates: a JPEG brochure of digitized art (136) having maximum 2500 pixels in any dimension; watermarked zoomable images of art (137); non-watermarked zoomable images of art (138); and/or a digital image of the digitized art in JPEG format having no more than 30,000 pixels in any dimension, or in RAW format, which can have more that 30,000 pixels in any dimension.

The zoomable set of files for each piece of art may be copied to an in-house web server, not shown, and navigated through using a browsing software. If an art image is to be made public via the Internet 123, a set of zoomable files protected by watermarks and a full jpeg print file is uploaded to the in-house web server or the central server 122. If long term robust image storage is desired, then the Encrypted Packed Session files are copied to a hard disk drive and sent via courier or normal mail to a designated uploading station. If a Multimedia digital video disk (DVD) is to be created, the zoomable files protected by watermarks is uploaded to the central server 122.

Referring now to FIGS. 14 to 17, a prototype 140 of the imaging robot 30 includes six major components: a base assembly 141 including the base 36, a vertical support guides assembly 142 including the second translator 31-2, a camera carriage 143 including the third translator 31-3 and the tilt stage 31-4, the controller 34 including the laptop 71 and stepper motor controls 72 (not shown in FIGS. 14 to 17), and an electrical power unit (not shown in FIGS. 14 to 17) mounted on the base assembly 141.

The base assembly 141 includes an aluminum rectangular structure 150 having four freely rotatable swivel casters 151 (only two shown), two guiding rollers 39, and one driven wheel 37. The swivel casters 151 allow the robot prototype 140 to be manually moved from one place to another, for example from one painting 33 to another. The driven wheel is powered through a DC stepping motor 152 controlled by the controller 34 (not shown) and provides autonomous controllable horizontal displacement of the entire prototype 140. The two guiding rollers 39 are located on the opposite side of the driven wheel 37. Their function is to keep the prototype 140 on the optional guidance rail or track 40.

The track 40 is a two-meter extendable modular track. It is placed on the floor 38 in front of the target art 33 and parallel to it at a fixed distance of about 1.5 meters from the art 33. The track 40 minimizes the lateral effects of bumps and dips. A rubber strip 161 (see FIG. 16) is placed at the bottom of the track 40, and the weight of the prototype 140 prevents the track 40 from moving. The base assembly 141 also accommodates the electrical power unit. The vertical support guides assembly 142 is attached to a linear bearing 154 at the base assembly 141. Once in place, the vertical support guides assembly is locked up using an L-handle 153. Two auxiliary tensors 144 are also locked to the base using similar L-handles, not shown.

Figure 14:
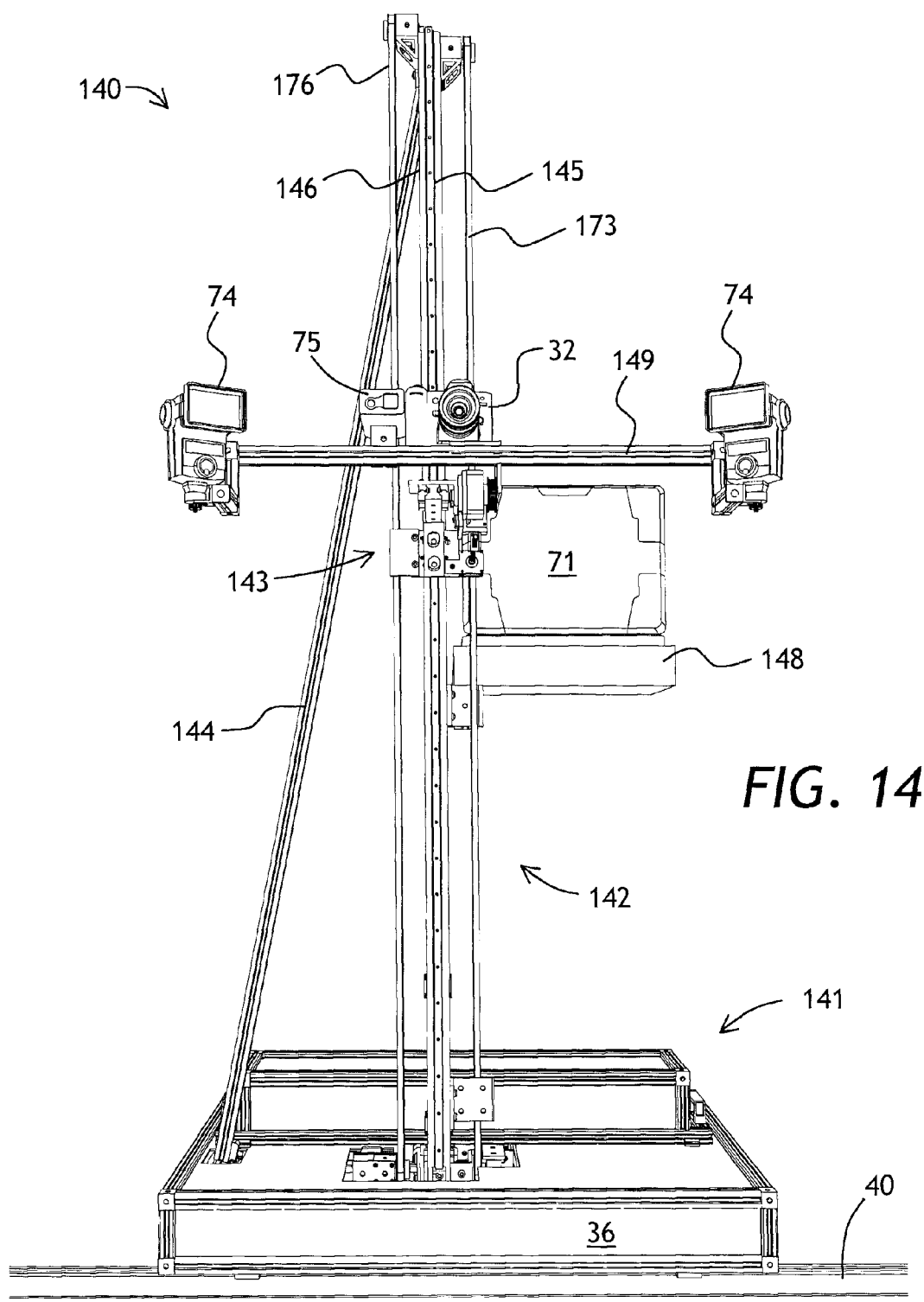
FIG. 14 is a three-dimensional frontal rendering of an imaging robot prototype of the invention.
Figure 15:
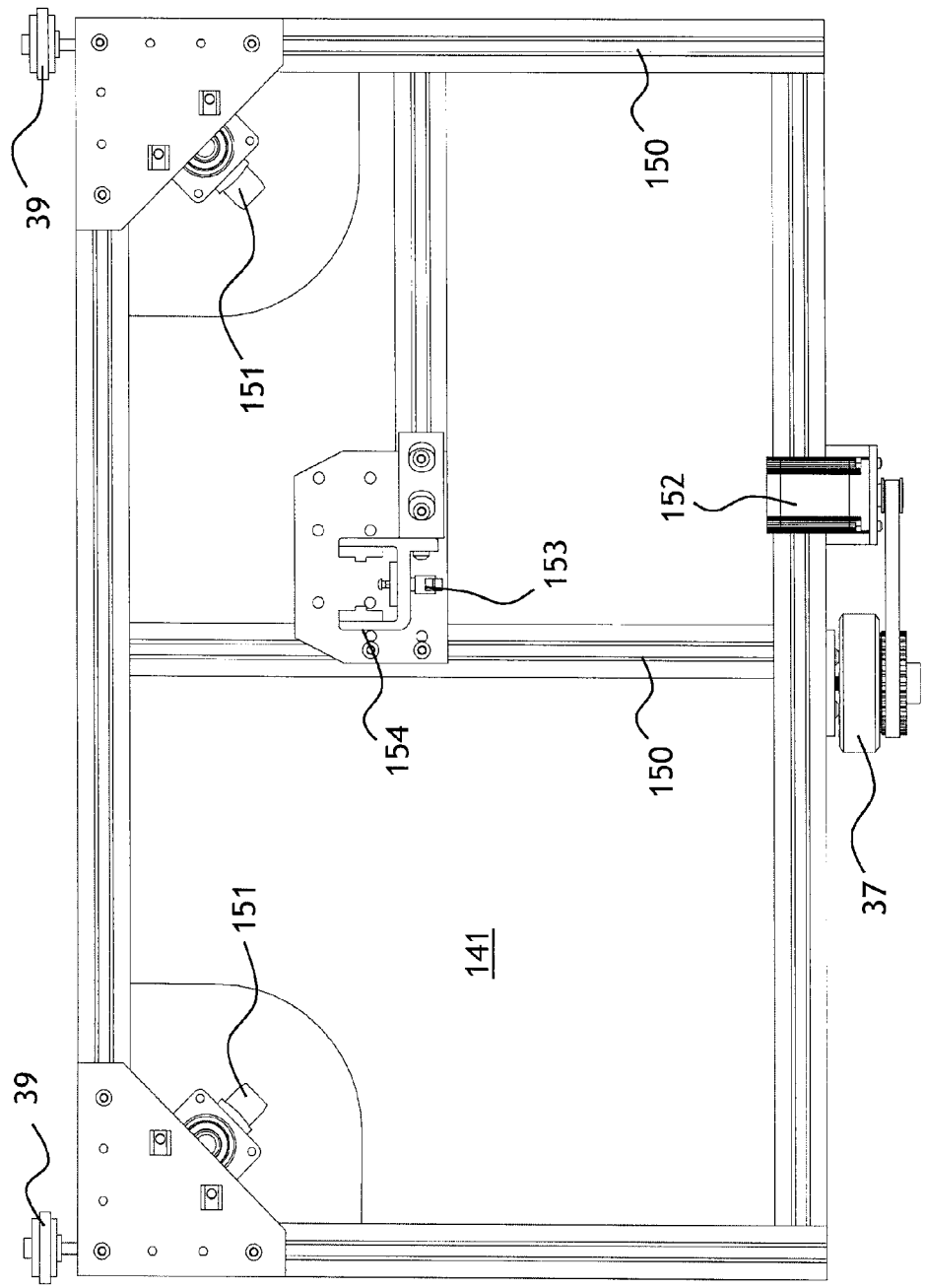
FIGS. 15 and 16 are plan and three dimensional renderings, respectively, of a base of the robot prototype of FIG. 14.
Figure 16:
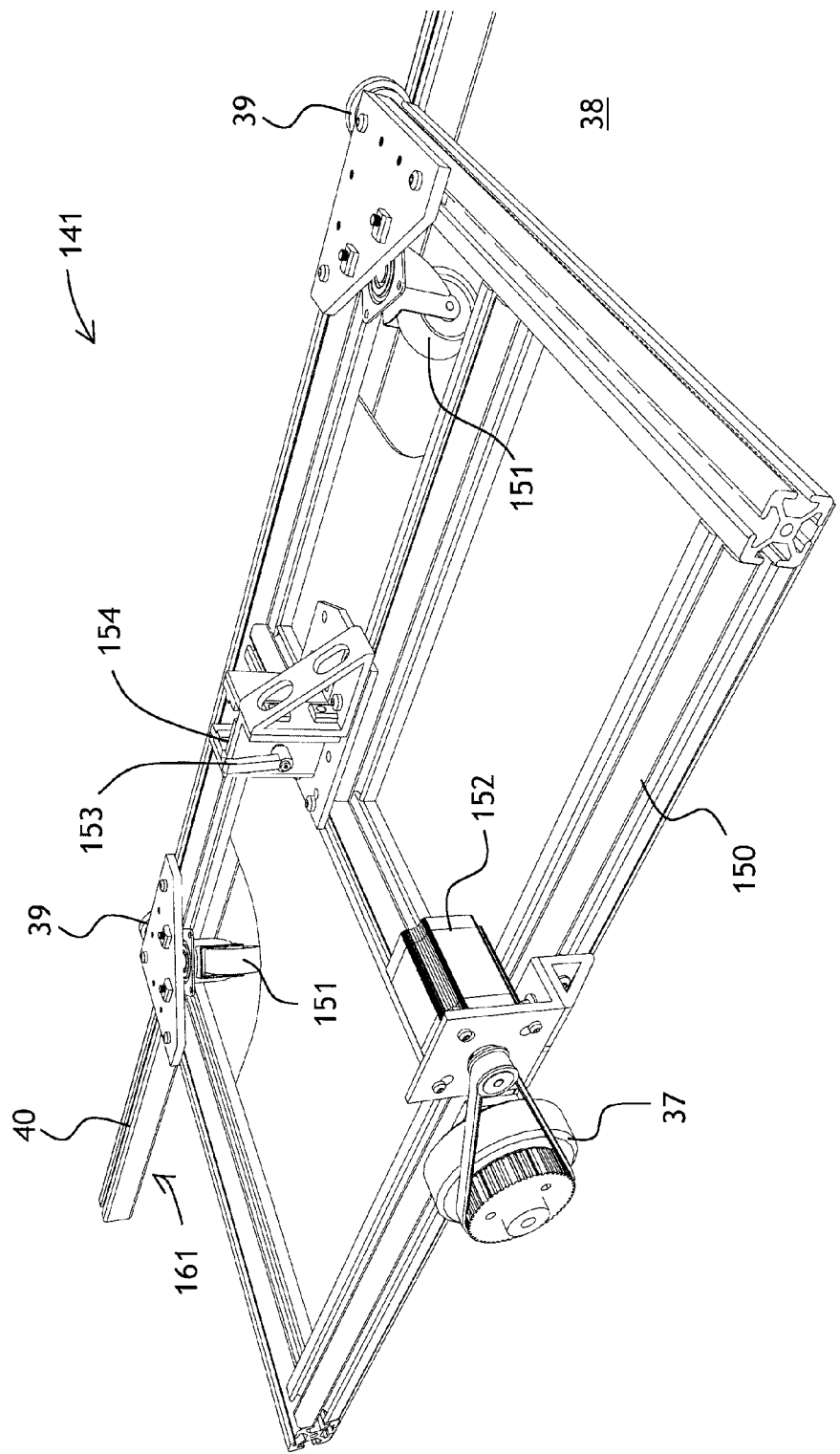
Figure 17:
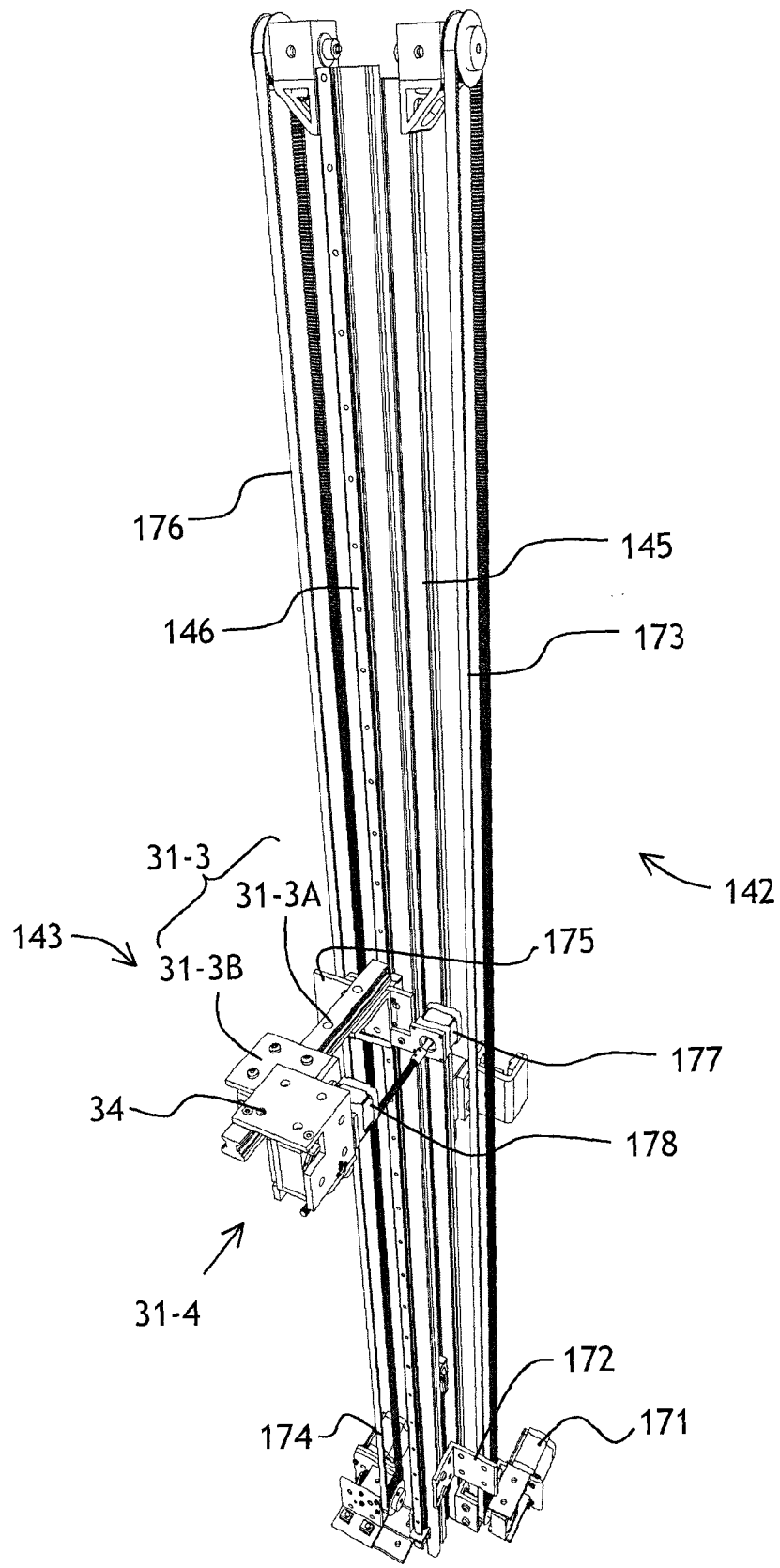
FIG. 17 is a three dimensional rendering of the second and the third linear translators, and an angular translator of the robot prototype of FIG. 14.

Referring specifically to FIGS. 14 and 17, the vertical support guides assembly 142 is made of two aluminum posts 145 and 146 attached to steel rails. Each post 145 and 146 is approximately 2 meters long. One post 145 is fixed, mounted on the base assembly 141. The other post 146 moves vertically along the fixed post 145. The movable post 146 is moved by a DC stepping motor 171 located at the lower end of the fixed post 145, two aluminum pulleys 172 located on each end (only one seen at the lower end), and a timing belt 173. The movable post 146 serves as a guide for the camera carriage assembly 143, which is slidably mounted on the movable post 146, that is, the camera carriage assembly 143 is movable in a vertical direction along the movable post 146. Movement of the camera carriage 143 along the movable post is performed by another DC motor 174 located at the lower end of the movable post 146, two aluminum pulleys 175 located on each end (only one seen), and a timing belt 176. All movements are automatically controlled by the controller 34, not shown in FIGS. 14 to 17. Thus, in the embodiment shown in FIGS. 14 to 17, the second (vertical) translator 31-2 of FIGS. 3A to 3C is a two-stage translator. Using two stages allows one to double the effective vertical travel of the camera 32, thereby increasing the maximum height of the painting 33 to about 5 meters above the floor level. Three stage vertical translator 31-2 can be used to increase maximal height of the painting 33 that can be imaged. Furthermore, at least one of the first, the second, and the third translators 31-1, 31-2, or 31-3 can include a robotic arm or a scissor lift, not shown, to increase the range. An additional tilt stage, not shown, can be used to tilt the camera 32 not only vertically but also horizontally.

The camera carriage 143 serves as a support platform for the high definition camera 32, the reference light source 75, and a photography flash units bar 149 including two flash units (flash lamps) 74. The camera 32, the reference light source 75, and the flash units 74 are detachable; they are mounted to the bar 149 using a simple mounting mechanism. The camera carriage 143 includes the third linear translator 31-3 and the tilt stage 31-4 mounted to a support, which runs vertically along the second post 146. The camera carriage 143 performs two different movements, a forward-backward horizontal movement by the third linear translator 31-3, and a tilt up-down angle movement by the tilt stage 31-4. These movements are driven using DC stepping motors 177 and 178, respectively. The camera carriage 143 can move relative to the base assembly 141 as follows: vertically by sliding up and down the second post 146, horizontally towards and away from the painting 33, and angularly up-down. Of course, the entire imaging robot prototype 140 can move horizontally along the painting 33. The horizontal movement of the prototype 140 is guided by the guiding rail 40. Thus, the prototype 140 provides four degrees of freedom of controllable movement of the camera 32: three mutually orthogonal linear degrees of freedom, plus one angular degree of freedom. Back and forth deviations caused by dips and bumps on the floor can be eliminated by adjusting the angle and the position of the camera 32.

The prototype 140 uses a dedicated digital camera 32, since dimensions of the camera 32, its line-up, lens, filters and flash sync influence the calculations and the process in general. In the embodiment of FIGS. 14 to 17, the reference light source 75 is a battery powered laser. Two independent photography flash units 74 are mounted at each side of the camera 32 in a symmetrical fashion. The flash units 74 are synchronized with the camera 32, or by the camera 32, which is triggered by the controller 34. Light provided by the flash units 74 makes the imaging robot prototype 140 virtually immune to ambient lighting.

The controller 34 includes electronics components and interface cards that control and command the system. Sensors are provided for calibration and security of the robot movements. The controller 34 includes the motor controller cards 72 that power the DC stepping motors 152, 171, 174, 177, and 178, the flash units electronic controls, as well as the control circuitry of the reference light source 75. A main power on-off switch turns the system on or off. Other electronic circuits are used to provide required power supply voltages.

The electrical power unit is located on the base assembly 141 to lower the center of gravity. It provides the power to run the controller 34, DC stepping motors 152, 171, 174, 177, and 178, the camera 32, the flash units 74, and the laptop PC 71. The primary power source is a battery bank which is intended to last a whole day working session. The battery bank serves is placed at the base assembly 141 to improve stability and prevent the vertical support guides assembly 142 from falling onto the art 33. The batteries are charged by built-in chargers connected to the AC mains when the imaging robot prototype 140 is not in use. The robot electrical system can also be feed by the AC mains.

The electrical interconnection among the different sets is made using ultra-flexible wires running inside protective flexible tubing. Connectors on each end of the wires and on the fixed surfaces allow for simple and speedy assembly and disassembly.

The laptop computer 71 on a pedestal 148 runs control software for controlling the imaging robot prototype 140. The pedestal 148 is detachably mounted to the fixed vertical post 145. The control software runs the robot prototype 140. It also downloads and indexes the captured images from the camera and stores them for off-line processing. The operator interacts with the robot through a graphic interface. Initially the prototype 140 is placed in front of the painting 33 with the reference light beams 76 pointing to the lower left corner of the painting 33. Movement amounts depend on the size of the painting 33 and the lens used, as calculated by the software once the dimensions of the painting 33 and chosen lens are entered. The software also calculates where the edges are based on the previously entered dimensions of the painting (art) 33.

On average, the imaging robot prototype 140 takes one photo per two seconds. Although the imaging robot prototype 140 is very stable, the software introduces a delay after every horizontal movement to allow the vertical support guides assembly 142 to stabilize before re-initiating a new column.

Figure 18:
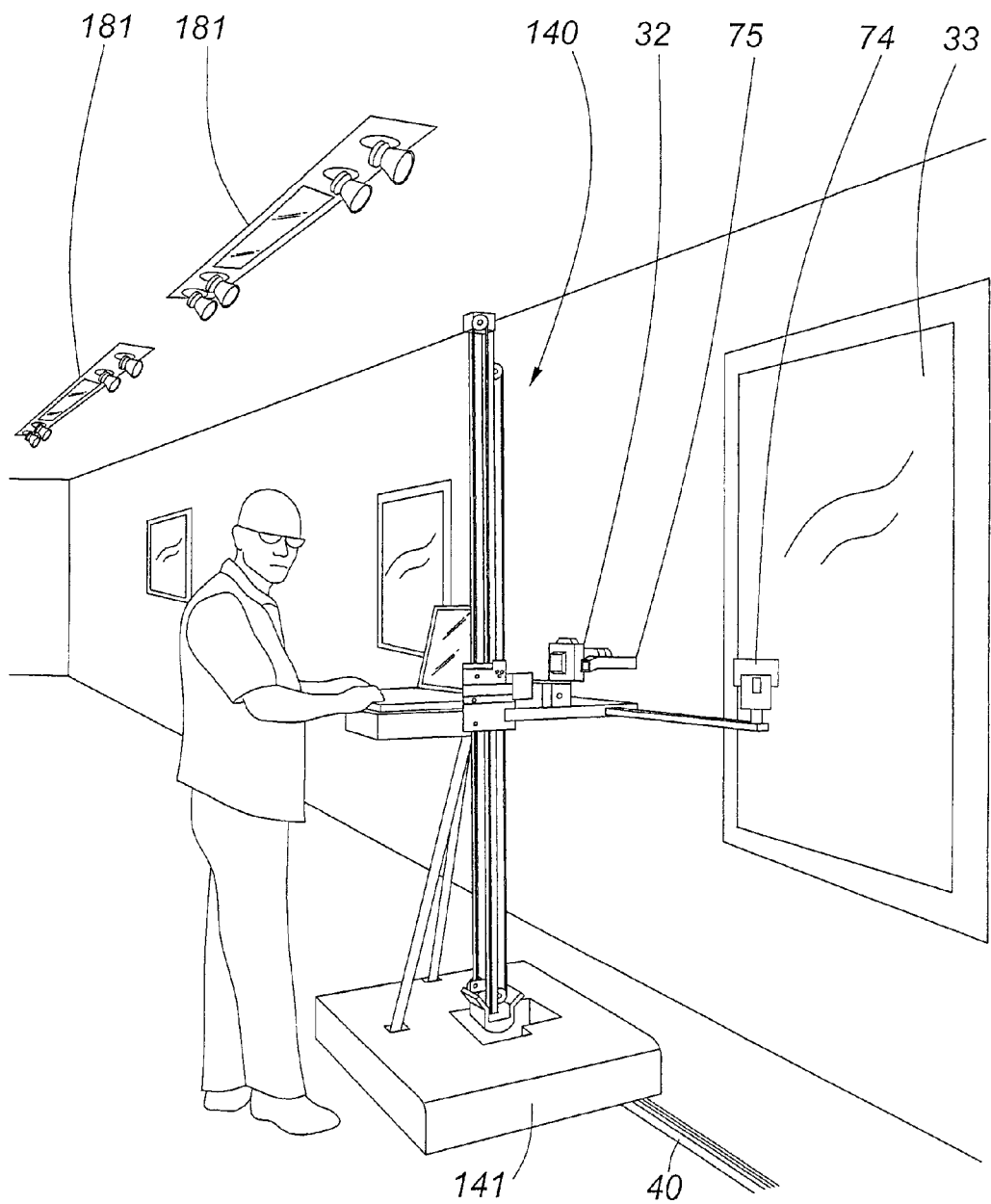
FIG. 18 is a view of the robot prototype of FIG. 14 in operation.

Turning now to FIG. 18, the imaging robot prototype 140 can capture 12 to 60 square meters of art in a single business day. The images of art can be captured at standard resolutions of 500 and 1000 dpi, or any other suitable resolution. Due to use of flash lamps 74, ambient lighting 181 can be left on during the capture of digital images of the painting 33.

It is to be understood that the embodiments described above are for purposes of illustrating the invention and its principle of operation. A person skilled in the art can easily conceive a variety of modifications, including but not limited to linear proportions, number of stages used for translation and angular movement of the camera, types of computers, illuminators, referencing systems, and so on. For this reason, one is cautioned not to limit the invention to the disclosed embodiments, but rather encouraged to determine the scope of the concept only with reference to the following claims.

What is claimed is:

1. An imaging robot for imaging a surface, comprising:
  a positioning system including a support and a digital camera mounted on the support for imaging the surface;
  wherein the positioning system comprises mutually orthogonal first, second, and third linear translators coupled to the support, for positioning the digital camera in front of the surface at a plurality of shooting positions forming a two-dimensional grid of positions spaced from the surface at a substantially same shooting distance;
    wherein the first translator comprises a horizontal base, a driven wheel mounted to the base, for rolling on a substantially horizontal floor, and a pair of rollers mounted to the base, for moving the base horizontally with respect to gravity, along the surface to be imaged;
    wherein the second translator comprises a linear translation stage extending vertically from the base, comprising a first portion mounted to the base, and a second portion translatable relative to the first portion, vertically with respect to gravity, and along the surface to be imaged;
    wherein the third translator comprises a linear translation stage having a first portion and a second portion translatable relative to the first portion, horizontally with respect to gravity, towards and away from the surface being imaged, wherein the first portion of the third translator is mounted to the second portion of the second translator; and
  a tilt stage coupled to the support, for orienting an optical axis of the digital camera perpendicular to the surface being imaged, wherein the tilt stage comprises first and second portions movable angularly with respect to each other, the first portion of the tilt stage being mounted to the second portion of the third translator, wherein the second portion of the tilt stage is mounted to the support;
  an illuminator for selective illumination of a portion of the surface being imaged by the digital camera; and
  a controller for providing control signals to the first, the second, and the third translators for positioning the digital camera, wherein the controller is operationally coupled to the digital camera for causing the digital camera to capture a component image of a portion of the surface at each of the shooting positions.

2. The imaging robot of claim 1, further comprising a first imaging device mounted on the support, wherein the first imaging device is selected from the group consisting of an X-ray imager, a holographic imager, and an optical scanner.

3. The imaging robot of claim 1, wherein the illuminator comprises a flash light source.

4. The imaging robot of claim 1, wherein the illuminator comprises a light emitting diode for emitting light in the visible, ultraviolet, and/or infrared wavelength range.

5. The photography robot of claim 1, further comprising a marker light source disposed in a fixed relationship to the support, to provide at least one marker beam of light directed towards the surface being imaged, to form at least one reference spot on the surface, for determination of a distance between the digital camera and the surface from a position of the at least one reference spot within a field of view of the digital camera.

6. The photography robot of claim 5, wherein the at least one marker beam includes three marker beams directed towards the surface being imaged, to form three non-collinear reference spots on the surface, for determination of a shooting angle of the digital camera from a relative position of the three reference spots within the field of view of the digital camera.

7. The imaging robot of claim 1, wherein at least one of the first, the second, and the third translators comprises a robotic arm or a scissor lift.

8. The imaging robot of claim 1, comprising a second imaging device mounted on the support in a fixed apart relationship with the digital camera.

* * * * *